United States Patent
Cheng et al.

(10) Patent No.: US 11,923,536 B2
(45) Date of Patent: Mar. 5, 2024

(54) COMPOSITE MATERIAL WITH CORE-SHELL STRUCTURE FOR BATTERY, SECONDARY BATTERY, BATTERY MODULE, BATTERY PACK AND APPARATUS

(71) Applicant: Contemporary Amperex Technology Co., Limited, Ningde (CN)

(72) Inventors: Bo Cheng, Ningde (CN); Changlong Han, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 274 days.

(21) Appl. No.: 17/345,109

(22) Filed: Jun. 11, 2021

(65) Prior Publication Data

US 2021/0305552 A1    Sep. 30, 2021

Related U.S. Application Data

(63) Continuation of application No. PCT/CN2020/125485, filed on Oct. 30, 2020.

(30) Foreign Application Priority Data

Nov. 29, 2019 (CN) .......................... 201911197009.5

(51) Int. Cl.
| | |
|---|---|
| *H01M 4/36* | (2006.01) |
| *H01M 4/02* | (2006.01) |
| *H01M 4/38* | (2006.01) |
| *H01M 4/48* | (2010.01) |
| *H01M 50/431* | (2021.01) |
| *H01M 50/446* | (2021.01) |

(52) U.S. Cl.
CPC ............. *H01M 4/366* (2013.01); *H01M 4/38* (2013.01); *H01M 4/48* (2013.01); *H01M 50/431* (2021.01); *H01M 50/446* (2021.01); *H01M 2004/021* (2013.01); *H01M 2004/027* (2013.01); *H01M 2004/028* (2013.01); *H01M 2220/10* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2003/0178604 A1 | 9/2003 | Okada et al. | |
| 2006/0216513 A1* | 9/2006 | Musick | C09C 1/3054 |
| | | | 428/404 |
| 2007/0190427 A1* | 8/2007 | Carlson | C04B 24/00 |
| | | | 429/251 |
| 2007/0284167 A1* | 12/2007 | Watanabe | B60L 58/24 |
| | | | 180/68.5 |
| 2014/0212467 A1* | 7/2014 | Chen | A01N 25/34 |
| | | | 424/630 |
| 2015/0325839 A1 | 11/2015 | Put et al. | |
| 2016/0107145 A1* | 4/2016 | Okazaki | B01J 35/004 |
| | | | 502/309 |
| 2016/0327551 A1* | 11/2016 | Mehrpouyan | C09K 11/06 |
| 2018/0229299 A1* | 8/2018 | Crane | B22F 1/102 |

FOREIGN PATENT DOCUMENTS

| | | |
|---|---|---|
| CN | 102335605 A | 2/2012 |
| CN | 103862039 A | 6/2014 |
| CN | 106833024 A | 6/2017 |
| CN | 107302086 A | 10/2017 |
| CN | 107732172 A | 2/2018 |
| CN | 108461808 A | 8/2018 |
| CN | 109742403 A | 5/2019 |
| CN | 110416525 A | 11/2019 |
| JP | 2005158627 A | 6/2005 |
| JP | 2018098018 A | 6/2018 |
| KR | 20190054829 A | 5/2019 |
| KR | 20190124389 A | 11/2019 |

OTHER PUBLICATIONS

Machine translation of CN 107732172, published on Feb. 23, 2018 (Year: 2018).*
The Second Office Action for CN Application No. 201911197009.5, dated Apr. 20, 2022, 8 pages.
The First Office Action for China Application No. 201911197009.5, dated Nov. 3, 2021, 13 pages.
D.Barreca et al.On the Performances of CuxO—TiO2(x=I, 2)Nanomaterials as Innovative Anodes for Thin Film Lithium Batteries ACS Applied Materials & Interfaces, vol. 4,No. 7,ISSN:1944-8244, p. 3610-3619, dated Jun. 16, 2021.
The Grant Notification for Chinese Application No. 201911197009. 5, dated Aug. 16, 2022, 6 pages.
The International Search Report for PCT Application No. PCT/CN2020/125485, dated Feb. 1, 2021, 13 pages.
The extended European search report for EP Application No. 20892294.8, dated Jan. 26, 2022, 7 pages.

* cited by examiner

*Primary Examiner* — Anca Eoff
(74) *Attorney, Agent, or Firm* — East IP P.C.

(57) ABSTRACT

The present application relates to a composite material with a core-shell structure for battery, wherein the core is made of a core material including metallic copper or a copper-containing compound; the shell is made of a shell material including at least one of silicon dioxide and titanium dioxide; and the core material has an average particle size D50 of 0.01 μm-5 μm, optionally 0.1 μm-3 μm, and more optionally 0.1 μm-2 μm. The present application also relates to secondary battery containing the composite material, a battery module, a battery pack, and an apparatus.

14 Claims, 4 Drawing Sheets

COMPOSITE MATERIAL WITH CORE-SHELL STRUCTURE FOR BATTERY, SECONDARY BATTERY, BATTERY MODULE, BATTERY PACK AND APPARATUS

CROSS-REFERENCE TO RELATED APPLICATION

This application is a continuation of International Application No. PCT/CN2020/125485, filed on Oct. 30, 2020, which claims priority to Chinese Patent Application No. 201911197009.5 filed on Nov. 29, 2019, both of which are incorporated herein by reference in its entirety.

TECHNICAL FIELD

This application belongs to the technical field of battery technology, and in particular to a composite material with a core-shell structure for battery, secondary battery, battery module, battery pack and apparatus.

BACKGROUND

With the rapid development of consumer electronics products and new energy vehicles with rechargeable batteries as the power system, people have higher requirements for batteries. Compared with lead-acid batteries, nickel-metal hydride batteries, and nickel-cadmium batteries, lithium batteries have the advantages of high specific energy density, high discharge rate and long cycle life, making them a mainstream position in the market for a long time.

With the expansion of application fields, especially from small portable electronic products to the development of power and energy storage fields having higher battery capacity requirements, higher technical challenges are presented to lithium batteries, especially the safety of lithium batteries. Lithium batteries usually use highly flammable organic solvents as electrolyte, so many safety issues may occur during battery use. Especially when the battery is overcharged, due to the increase in voltage, the stability of the positive electrode becomes worse, causing the side reaction between it and the electrolyte to intensify. As a result, the battery temperature rises sharply and the heat gradually accumulates, which eventually leads to battery failure, fire or even explosion, bringing great safety hazards to new energy vehicles.

Therefore, preventing the battery from overcharging is a basic guarantee to ensure the safe use of lithium batteries. At present, in order to prevent the battery from being overcharged, on the one hand, cathode passivation additives can be added to the electrolyte, so that when the battery is overcharged, the additive reacts with the cathode to form a dense polymer passivation film, which can block the current. However, the introduction of the additive will deteriorate the electrical performance of the battery; on the other hand, the redox shuttle additives can be added to the electrolyte, and the additive is oxidized at the cathode and reduced at the anode by itself, and shuttles back and forth to achieve the purpose of consuming current. However, such additives have the disadvantages of low oxidation potential and low consumption of overload current.

SUMMARY

The first aspect of the present application provides a composite material with a core-shell structure for battery, wherein the core is made of a core material including metallic copper or a copper-containing compound; the shell is made of a shell material including at least one of silicon dioxide (i.e. silica) and titanium dioxide; and the core material has an average particle size D50 of 0.01 μm-5 μm, optionally 0.1 μm-3 μm, and more optionally 0.1 μm-2 μm.

The composite material with a core-shell structure for battery provided in the present application is applied to a lithium-ion battery, which effectively improves the safety performance of the battery caused by overcharge; at the same time, the composite material does not affect the electrical properties of the battery in normal voltage range, such as cycle, storage, gas production and the like, which can effectively solve the problem of battery failure caused by the oxidation of the electrolyte under the high voltage of the lithium-ion battery during the overcharge process.

In some embodiments of the first aspect of the present application, the above-mentioned copper-containing compound includes at least one of copper oxide, cuprous oxide, copper sulfide, cuprous sulfide, basic copper carbonate, copper sulfate, and copper sulfate-ammonia complex.

The inventors of the present application have found that by selecting specific core material and shell material, a composite material with a core-shell structure is obtained, and the core material will react with the hydrofluoric acid generated by the electrolyte to generate copper ions. Under the action of the electric field force inside the battery, the copper ion will migrate to the surface of the negative electrode and be reduced to form copper dendrites. The copper dendrites gradually grow on the surface of the negative electrode and pierce the separator, causing a local internal short circuit inside the battery, causing the battery voltage to drop to a safe voltage of below 4.5V, so that the side reaction between the positive electrode and the electrolyte is reduced, the internal temperature rise and gas production of the battery are correspondingly reduced, and the heat accumulation is reduced. It can effectively solve the problem of the battery failure caused by the oxidation of the electrolyte under the high voltage of the lithium-ion battery during the overcharge process.

In some embodiments of the first aspect of the present application, the shell has an average thickness of 10 nm to 2 μm, optionally 100 nm to 1 μm, and more optionally from 200 nm to 600 nm. The average thickness of the shell within the above range can ensure the effective release of the core material in the overcharged state.

In some embodiments of the first aspect of the present application, the composite material has a resistivity of $10^6$ Ω·cm to $10^{10}$ Ω·cm, optionally $10^7$ Ω·cm to $10^8$ Ω·cm, and/or the composite material has a BET of 0.2 m²/g to 20 m²/g, optional 7 m²/g to 12 m²/g. The resistivity of the composite material within an appropriate range can further ensure the effective release of the core material under the premise of ensuring the normal charge and discharge of the battery. The BET of the composite material within an appropriate range can ensure good compatibility of the composite material in the positive and negative electrodes, and can provide a better overall effect.

In some embodiments of the first aspect of the present application, the weight ratio of the core to the shell is from 10:1 to 20:1, optionally from 14:1 to 18:1. The weight ratio of the core to the shell within an appropriate range can ensure the effective release of the core material in overcharge state.

A second aspect of the present application provides a secondary battery, including the composite material described in the first aspect of the present application.

In some embodiments of the second aspect of the present application, the above-mentioned secondary battery includes an outer packaging and a battery and an electrolyte contained in the outer packaging, and the battery including a positive electrode plate, a negative electrode plate, and a separator, wherein at least one of the positive electrode plate, the negative electrode plate and the separator includes the composite material described in the first aspect of the present application, and optionally the secondary battery is a lithium-ion secondary battery.

Since the secondary battery uses the composite material according to the first aspect of the embodiments of the present application, it effectively solves the problem of battery thermal failure due to side reactions caused by the oxidation of the electrolyte under a high voltage when the battery is overcharged, so that the battery has excellent overcharge resistance.

In some embodiments of the second aspect of the present application, when the separator includes the composite material, the composite material is added in an amount of 0.1 g to 3 g per unit area ($m^2$) of the separator, optionally 0.2 $g/m^2$-0.5 $g/m^2$. The added amount of the composite material within an appropriate range can ensure the overcharge resistance of the lithium-ion battery while not having a negative impact on the energy density of the secondary battery.

In some embodiments of the second aspect of the present application, when the negative electrode plate includes the composite material, the composite material is added in an amount of 0.2 wt % to 20 wt %, relative to the weight of the negative active material contained in the negative electrode plate, optionally 0.3 wt % to 10 wt %, and more optionally 0.5 wt % to 5 wt %. The amount of the composite material within an appropriate range can ensure the overcharge resistance of the lithium-ion battery while not having a negative impact on the energy density of the secondary battery.

In some embodiments of the second aspect of the present application, when the positive electrode plate includes the composite material, the composite material is added in an amount of 0.2 wt % to 20 wt %, relative to the weight of the positive active material contained in the positive electrode plate, optionally 0.3 wt % to 10 wt %, and more optionally 0.5 wt % to 5 wt %. The amount of the composite material within an appropriate range can ensure the overcharge resistance of the lithium-ion battery while not having a negative impact on the energy density of the secondary battery.

In some embodiments of the second aspect of the present application, the separator has a thickness of less than 20 μm, and optionally the separator has a thickness of 6 μm-16 μm. The separator has a thickness in an appropriate range, so that the formed copper dendrites can pierce it but the lithium dendrites are not easy to pierce it.

A third aspect of the present application provides a battery module, including the secondary battery according to the second aspect of the present application.

A fourth aspect of the present application provides a battery pack including the battery module according to the third aspect of the present application.

A fifth aspect of the present application provides an apparatus, including the secondary battery according to the second aspect of the present application, wherein the secondary battery is used as a power source or an energy storage unit of the apparatus.

The battery module, battery pack, and apparatus of the present application include the secondary battery described in the present application, and therefore have at least the same or similar technical effects as the secondary battery.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

Figure 1:
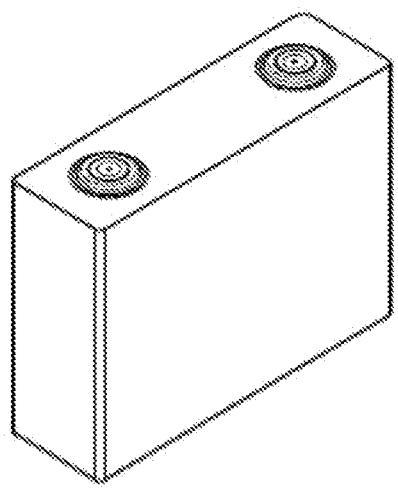
FIG. 1 is a perspective view of an embodiment of a lithium ion battery.
Figure 2:
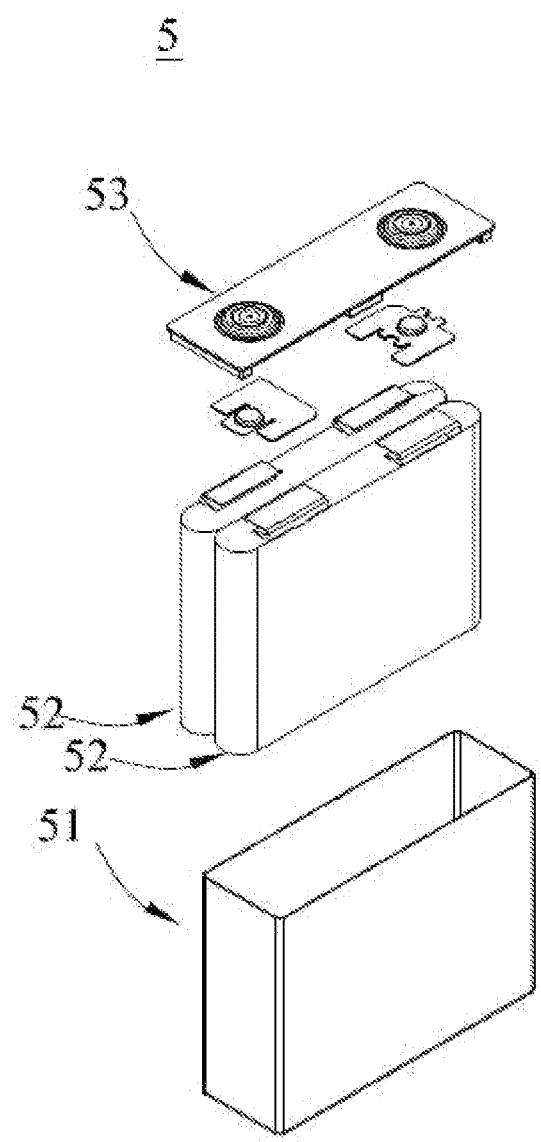
FIG. 2 is an exploded view of FIG. 1.
Figure 3:
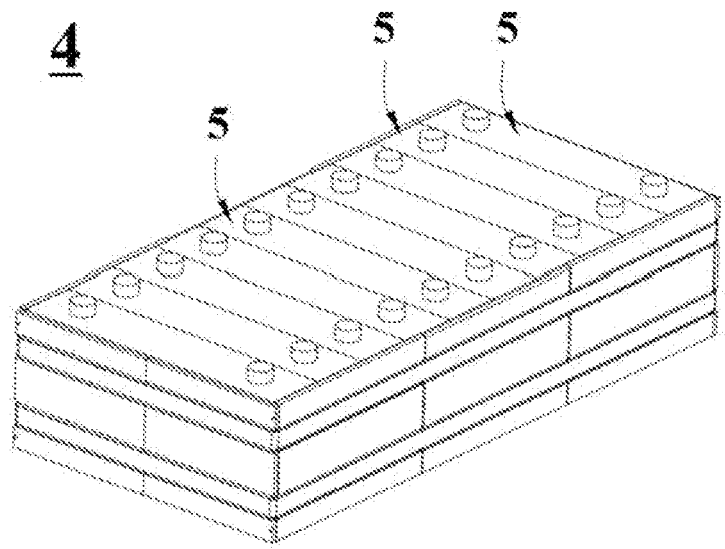
FIG. 3 is a perspective view of an embodiment of a battery module.
Figure 4:
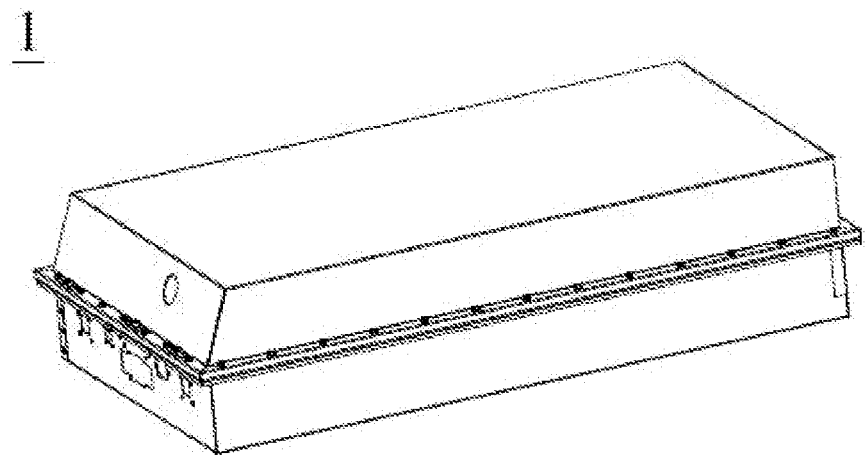
FIG. 4 is a perspective view of an embodiment of a battery pack.
Figure 5:
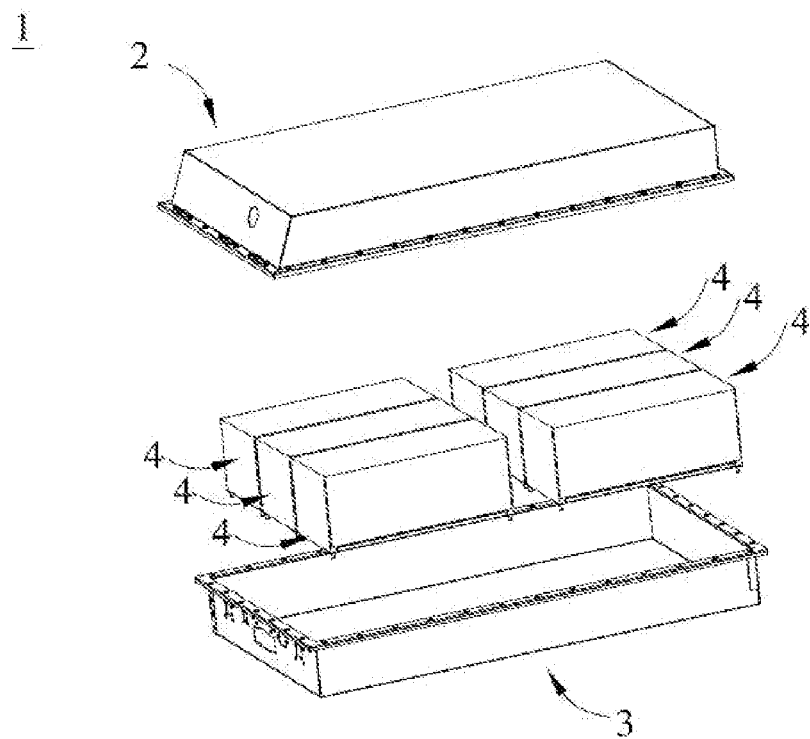
FIG. 5 is an exploded view of FIG. 4.
Figure 6:
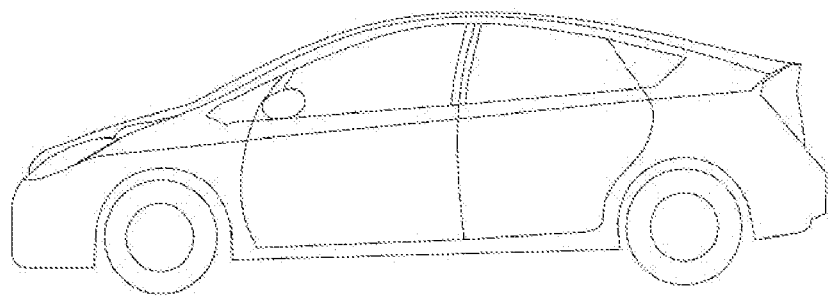
FIG. 6 is a schematic view showing an embodiment of an apparatus using a lithium ion battery as a powder source.

In the drawings, the reference numerals are defined as follows:

1 battery pack
2 upper cabinet body
3 lower cabinet body
4 battery module
   5 battery
      51 housing
      52 electrode assembly
      53 top cover assembly.

DETAILED DESCRIPTION

In order to make the object, technical solution, and technical effects of the present application apparent, the following further describes the present application in detail with reference to the embodiments. It should be understood that the embodiments described in the present description are only for explaining the present application, and are not intended to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value or combined with other lower or upper limits to form a range that is not explicitly specified.

In the description herein, it should be noted that, unless otherwise stated, the recitation of numerical ranges by "no less than" and "no more than" include all numbers within that range including the endpoints, and the recitation of "more" in the phrase "one or more" includes two or more.

In the context of the present application, the term "SOC (State of Charge)" represents the remaining power, i.e., the ratio of the remaining capacity of the battery after a period of time or long-term storage to the capacity in a fully charged state, expressed as a percentage. The value range of the remaining power SOC is from 0 to 1. When SOC=0, the battery is fully discharged, and when SOC=1, the battery is fully charged.

The terms "optional" and "optionally" refer to embodiments of the present application that can provide certain benefits under certain circumstances. However, under the same or other circumstances, other embodiments may also be optional. In addition, the recitation of one or more optional embodiments does not mean that other embodiments are unavailable, and is not intended to exclude other embodiments from the scope of the present application.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Composite Material

The first aspect of the present application provides a composite material with a core-shell structure for battery, wherein the core is made of a core material comprising metallic copper or a copper-containing compound; the shell is made of a shell material comprising at least one of silicon dioxide and titanium dioxide; and the core material has an average particle size D50 of 0.01 µm to 5 µm, optionally 0.1 µm to 3 µm, and more optionally 0.1 µm to 2 µm.

Generally, when the battery is overcharged, the electrolyte is oxidized at a high voltage to generate hydrofluoric acid (HF). Therefore, the shell material is selected from at least one of silicon dioxide and titanium dioxide, because these two compounds can react with HF, thereby ensuring the release of the core material in overcharge state.

In the embodiment according to the present application, the core material has an average particle size of 0.01 µm to 5 µm, optionally 0.1 µm to 3 µm, and more optionally 0.1 µm to 2 µm. If the particle size is too small, it cannot guarantee to play a short-circuit effect in time in overcharge state; if the particle size is too large, it will affect the coating effect.

In the present application, the average particle size D50 is used to characterize the particle size of the core material, and its physical meaning is the particle size corresponding to 50% of the volume distribution of the core material particles, i.e., volume average particle size. D50 can be measured by methods known in the art, for example, by laser diffraction. Specifically, a laser diffraction particle size distribution analyzer (such as Mastersizer 3000) can be used to measure the particle size distribution according to Particle size analysis-Laser diffraction methods GB/T19077-2016, and then the average particle size corresponding to the median value of the volume distribution can be obtained.

As described above, usually when the battery is overcharged, the electrolyte is oxidized under high voltage to produce hydrofluoric acid. The hydrofluoric acid reacts with the shell material of the composite material, thereby releasing the core material in the shell. Therefore, if the shell is too thick, the effective release of the core material in overcharge state cannot be guaranteed; and if the shell is too thin, the release of the core material during the normal charge and discharge process may cause the battery to fail. Therefore, according to the embodiment of the present application, the shell has an average thickness of 10 nm to 2 µm, optionally 100 nm to 1 µm, and more optionally 200 nm to 600 nm.

Suitable copper-containing compounds comprises at least one of copper oxide, cuprous oxide, copper sulfide, cuprous sulfide, basic copper carbonate, copper sulfate, and copper sulfate-ammonia complex.

Optionally, the core material is selected from at least one of metallic copper, cuprous oxide and copper sulfide.

The inventors of the present application have found that by selecting specific core materials and shell materials to obtain a composite material with a core-shell structure, the following effects can be achieved: the core material will react with the hydrofluoric acid generated by the electrolyte and copper ions are generated, which will migrate to the surface of the negative electrode under the action of the internal electric field of the battery and be reduced to form copper dendrites. The copper dendrites gradually grow on the surface of the negative electrode and pierce the separator, causing a local internal short circuit inside the battery, which makes the voltage of battery drastically drop below the safe voltage of 4.5V, thus reducing the side reactions between the positive electrode and the electrolyte, reducing the internal temperature rise and gas production of the battery, and reducing the heat accumulation, which can effectively solve problem of lithium ion battery failure caused by the oxidation of the electrolyte under a high voltage during the overcharge process.

The composite material with a core-shell structure for battery according to the present application can be formed by any suitable method known in the art. Optionally, the composite material is formed by one or more methods selected from a solid phase heating method, a liquid phase precipitation coating method, a thermal precipitation method, and a sol-gel method.

In order to achieve effective coating, the weight ratio of the core to the shell is from 10:1 to 20:1, and may be from 14:1 to 18:1. If the core-shell weight ratio is too large, it will cause the release of core material during normal charging and discharging and cause the battery to fail; if the core-shell weight ratio is too small, the effective release of the core material in overcharge state cannot be guaranteed.

The composite material can be applied to the surface of a positive electrode plate or a negative electrode plate or a separator. When it is applied to the surface of the positive electrode plate, it can be realized by coating the surface of the positive electrode plate; when it is applied to the surface of the negative electrode plate, it can be realized by coating the surface of the negative electrode plate; when it is applied to the surface of the separator, it can be realized by coating the surface of the separator.

When the added amount of the composite material is too low, the short-circuit effect cannot be achieved, which is insufficient to ensure the overcharge resistance performance of the lithium ion battery; and when the added amount of the composite material is too high, correspondingly, the weight percentage of the positive or negative active material in the electrode plate is relatively reduced, and the energy density of the lithium-ion battery will be reduced. Therefore, when the negative electrode plate contains the composite material, the amount of the composite material is from 0.2 wt % to 20 wt %, relative to the weight of the negative active material contained in the negative electrode plate, optionally from 0.3 wt % to 10 wt %, more optionally from 0.5 wt % to 5 wt %; and/or when the positive electrode plate contains the composite material, relative to the weight of the positive active material contained in the positive electrode plate, the amount of the composite material is from 0.2 wt % to 20 wt %, optionally from 0.3 wt % to 10 wt %, more optionally from 0.5 wt % to 5 wt %; and/or, when the separator contains the composite material, the added amount of the composite material is from 0.1 g to 3 g per unit area (m²) of the separator, optionally 0.2 g/m²-0.5 g/m².

If the particle size of the composite material is too small, the specific surface area (by BET method) will increase, and side reactions will increase; and if the particle size of the composite material is too large, the coating thickness will be too large and the thickness will tend to be uneven. Optionally, the average particle size D50 of the composite material may be from 400 nm to 40 μm, optionally from 600 nm to 15 μm. Also optionally, the specific surface area (by BET method)of the composite material is from 0.2 m²/g to 20 m²/g, optionally from 7 m²/g to 12 m²/g. If the specific surface area of the composite material is too large, the side reactions will increase and affect the battery performance; and if the specific surface area of the composite material is too large, a higher proportion of binder needs to be consumed. In addition, when the specific surface area (by BET method) of the composite material is from 0.2 m²/g to 20 m²/g, optionally from 7 m²/g to 12 m²/g, since this range is the specific surface area range of the positive and negative materials, the specific surface area can consistently ensure that the compatibility of the composite material in the negative and positive electrode is good, which can provide a better overall effect.

In addition, if the resistivity of the composite material is too small, the normal charge and discharge of the battery will fail; if it is too large, the effective release of the core material cannot be guaranteed. Therefore, in the embodiment according to the present application, the resistivity of the composite material is from $10^6$ Ω·cm to $10^{10}$ Ω·cm, optionally from $10^7$ Ω·cm to $10^8$ Ω·cm.

Secondary Battery

The secondary battery according to the second aspect of the present application will be described below.

The secondary battery of the second aspect of the present application comprises an outer packaging and a battery and electrolyte contained in the outer packaging, the battery comprising a positive electrode plate, a negative electrode plate, and a separator. It can be understood that as long as the position can be in contact with the electrolyte in the battery, it can contain the composite material with a core-shell structure for battery of the first aspect of the present application.

The second aspect of the present application provides a secondary battery, comprising a positive electrode plate, a negative electrode plate, a separator, an electrolyte, and the composite material according to the first aspect of the present application. Optionally, the secondary battery according to the second aspect of the present application is a lithium-ion secondary battery.

Since the secondary battery uses the composite material according to the first aspect of the embodiments of the present application, it effectively solves the problem of battery thermal failure due to side reactions caused by the oxidation of the electrolyte under a high voltage when the battery is overcharged, so that the battery has excellent overcharge resistance Optionally, at least one of the positive electrode plate, the negative electrode plate and the separator comprises the composite material according to the first aspect of the present application.

Specifically, in the secondary battery of the present application, the positive electrode plate comprises a positive electrode current collector and a positive electrode layer disposed on at least one surface of the positive electrode current collector and comprising a positive active material, and the positive electrode layer may further comprise the composite material according to the first aspect of the present application.

The present application has no special limitation on the composition of the positive active material. The positive active material can be selected from lithium cobalt oxide, lithium nickel oxide, lithium manganese oxide, lithium nickel manganese oxide, lithium nickel cobalt manganese oxide, lithium nickel cobalt aluminum oxide, lithium containing phosphate with olivine structure and the like. However, the present application is not limited to these materials, and other conventionally known materials that can be used as a positive active material for secondary battery can also be used. These positive active materials may be used alone or in combination of two or more. Optionally, the positive active material comprises one or more of lithium nickel cobalt manganese oxide and lithium nickel cobalt aluminum oxide.

Although the present application does not have special limitation on the composition of the positive active material of the positive electrode plate, the composite material according to the first aspect of the present application has more prominent advantages when it is applied to the positive electrode plate that requires high overcharge resistance. Therefore, the composite material of the present application is particularly suitable for positive electrode plates with high requirements for overcharge resistance, for example, positive electrode plates containing high nickel ternary materials as positive active materials. In the context of the present application, "high nickel ternary material" refers to a ternary material in which the mole fraction of nickel is greater than or equal to 0.5, such as $Li_{1+x}Ni_aCo_bMe_{(1-a-b)}O_2$, in which $-0.1 \le x \le 0.2$, $0.5 \le a < 1$ (optionally, $0.8 \le a < 1$), $0 < b < 1$, Me is selected from at least one of Mn, Al, Mg, Zn, Ga, Ba, Fe, Cr, Sn, V, Sc, Ti, and Zr (optionally Mn or Al). Therefore, in an optional embodiment of the present application, the positive active material layer contains $Li_{1+x}Ni_aCo_bMe_{(1-a-b)}O_2$, in which $-0.1 \le x \le 0.2$, $0.5 \le a < 1$ (optionally, $0.8 \le a < 1$), $0 < b < 1$, Me is selected from at least one of Mn, Al, Mg, Zn, Ga, Ba, Fe, Cr, Sn, V, Sc, Ti, and Zr (optionally Mn or Al). These materials are well known in the art, and their composition and preparation methods are also well known in the art.

The positive electrode plate may optionally comprise a binder and a conductive agent. The type and content of the binder and the conductive agent are not specifically limited, and can be selected according to actual needs.

The positive electrode current collector can use materials commonly used in the art, such as metal sheets or metal foils of stainless steel, aluminum, copper, titanium and the like. Optionally, the positive electrode current collector is an aluminum foil.

Specifically, in the secondary battery of the present application, the negative electrode plate comprises a negative electrode current collector and a negative electrode layer disposed on at least one surface of the negative electrode current collector and comprising a negative active material, the negative electrode layer may further comprise the composite material of the first aspect of the present application.

The negative active material may be selected from artificial graphite, natural graphite, soft carbon, hard carbon, silicon-based materials, tin-based materials, and the like. However, the present application is not limited to these materials, and other conventionally known materials that can be used as a negative e active material for secondary battery can also be used. These negative active materials may be used alone or in combination of two or more. Optionally, the negative active material comprises one or more of artificial graphite, natural graphite, and silicon-based materials.

The negative electrode layer may optionally comprises a binder and a conductive agent. The type and content of the binder and the conductive agent are not specifically limited, and can be selected according to actual needs.

The negative electrode current collector can use materials commonly used in the art, such as metal foils or porous metal plates. Optionally, the negative electrode current collector is a copper foil.

In the secondary battery according to the second aspect of the present application, the specific type of the separator is not specifically limited, and can be any separator material used in existing batteries, such as polyethylene, polypropylene, polyvinylidene fluoride, and a composite film thereof, but not limited to these. The separator may further comprise the composite material according to the first aspect of the present application.

When the battery is overcharged, the electrolyte is oxidized at a high voltage to produce hydrofluoric acid. The hydrofluoric acid can react with the shell material of the composite material to release the core material in the shell, and the core material will react with the hydrofluoric acid generated in the electrolyte to produce copper ions. The copper ions will migrate to the surface of the negative electrode under the action of the internal electric field of the battery and be reduced to form copper dendrites. The copper dendrites gradually grow on the surface of the negative electrode and pierce the separator, causing local internal short circuit in the battery, making the voltage of the battery drop significantly below the safe voltage of 4.5V, thereby reducing the side reactions between the positive electrode and the electrolyte. Therefore, the separator should not be too thick or too thin, and the separator should be such that the formed copper dendrites can pierce but the lithium dendrites are not easy to pierce. Specifically, the thickness of the separator should be less than 20 μm, optionally, the thickness of the separator is from 6 μm to 16 um.

As described above, the composite material can be applied to the surface of the positive electrode plate or the negative electrode plate or the separator. All can be achieved by coating.

If the added amount of the composite material is too low, the short-circuit effect cannot be achieved, and it is not enough to ensure the overcharge resistance performance of the lithium-ion battery; and if the added amount of the composite material is too high, correspondingly, the weight percentage of the positive or negative active material in the electrode plate is relatively reduced, and the energy density of the lithium-ion battery will be reduced. Therefore, if the negative electrode plate contains the composite material, the amount of the composite material is from 0.2 wt % to 20 wt %, optionally from 0.3 wt % to 10 wt %, more optionally from 0.5 wt % to 5 wt %, relative to the weight of the negative active material contained in the negative electrode plate; and/or if the positive electrode plate contains the composite material, relative to the weight of the positive active material contained in the positive electrode plate, the amount of the composite material is from 0.2 wt % to 20 wt %, optionally from 0.3 wt % to 10 wt %, more optionally from 0.5 wt % to 5 wt %; and/or if the separator contains the composite material, based on the surface area of the separator, the added amount of the composite material is from 0.1 g/m$^2$ to 3 g/m$^2$, optionally from 0.2 g/m$^2$ to 0.5 g/m$^2$.

Specifically, in the secondary battery of the present application, the electrolyte comprises an electrolytic salt and a non-aqueous organic solvent.

The types of the electrolytic salt and the non-aqueous organic solvent are not specifically limited, as long as the electrolyte can be oxidized at a high voltage to generate hydrofluoric acid, and therefore can be selected according to actual needs. For example, as the non-aqueous electrolyte, the solution formed by dissolving an electrolytic salt in a non-aqueous organic solvent is generally used.

As the electrolytic salt used in the present application, the following lithium salt can be suitably exemplified.

[Li salt-Type I]: It may be "a complex salts of Lewis acid with LiF" suitably selected from one or more of LiPF$_6$, LiBF$_4$, LiAsF$_6$, LiSbF$_6$, LiPF$_4$(CF$_3$)$_2$, LiPF$_3$(C$_2$F$_5$)$_3$, LiPF$_3$(CF$_3$)$_3$, LiPF$_3$(iso-C$_3$F$_7$)$_3$, and LiPF$_5$ (iso-C3F7), optionally from LiPF$_6$, LiBF$_4$, LiAsF$_6$, and more optionally from LiPF$_6$ and LiBF$_4$.

[Li salt-Type II]: It may be "imine or methylated lithium salt" suitably selected from one or more of LiN(SO$_2$F)$_2$, LiN(SO$_2$CF$_3$)$_2$, LiN(SO$_2$C$_2$F$_5$)$_2$, (CF$_2$)$_2$(SO$_2$)$_2$NLi (cyclic), (CF$_2$)$_3$(SO$_2$)$_2$NLi (cyclic), and LiC(SO$_2$CF$_3$)$_3$, optionally from LiN(SO$_2$F)$_2$, LiN(SO$_2$CF$_3$)$_2$ or LiN(SO$_2$C$_2$F$_5$)$_2$, more optionally from LiN(SO$_2$F)$_2$ or LiN(SO$_2$CF$_3$)$_2$.

[Li salt-Type III]: It may be "a lithium salt containing a S(=O)$_2$O structure" suitably selected from one or more of LiSO$_3$F, LiCF$_3$SO$_3$, CH$_3$SO$_4$Li, C$_2$H$_5$SO$_4$Li, C$_3$H$_7$SO$_4$Li, lithium trifluoro((methylsulfonyl)oxy)borate (LiTFMSB), lithium pentafluoro((methylsulfonyl)oxy)phosphate (LiPFMSP), more optionally from LiSO$_3$F, CH$_3$SO$_4$Li, C$_2$H$_5$SO$_4$Li or LiTFMSB.

[Li salt-Type IV]: It may be "a lithium salt containing a P=P or Cl=O structure" suitably selected from one or more of LiPO$_2$F$_2$, Li$_2$PO$_3$F and LiClO$_4$, optionally from LiPO$_2$F$_2$, Li$_2$PO$_3$F.

[Li salt-Type V]: It may be "a lithium salt with an oxalate ligand as an anion" suitably selected from one or more of lithium bis[oxalate-O,O'] borate (LiBOB), lithium difluoro [oxalate-O, O'] borate, lithium difluorobis[oxalate-O,O'] phosphate (LiPFO) and lithium tetrafluoro [oxalate-O,O'] phosphate, more optionally selected from LiBOB and LiPFO.

The above lithium salts may be used alone or in combination. Optionally, the lithium salt is selected from one or more of LiPF$_6$, LiPO$_2$F$_2$, Li$_2$PO$_3$F, LiBF$_4$, LiSO$_3$F, lithium trifluoro((methylsulfonyl)oxy)borate (LiTFMSB), LiN(SO$_2$F)$_2$, LiN(SO$_2$CF$_3$)$_2$, LiN (SO$_2$C$_2$F$_5$)$_2$, lithium bis[oxalate-O,O'] borate (LiBOB), lithium difluorobis[oxalate-O, O'] phosphate (LiPFO) and lithium tetrafluoro [oxalate-O, O'] phosphate. More optionally, the lithium salt is selected from one or more of LiPF$_6$, LiBF$_4$, LiSO$_3$F, lithium trifluoro ((methylsulfonyl)oxy)borate (LiTFMSB), LiPO$_2$F$_2$, LiN (SO$_2$CF$_3$)$_2$, LiN(SO$_2$F)$_2$, lithium bis[oxalate-O,O'] borate (LiBOB) and lithium difluorobis[oxalate-O,O'] phosphate (LiPFO). Further optionally, the lithium salt is LiPF$_6$.

According to the present application, suitable non-aqueous organic solvent is selected from at least one of ethylene carbonate (EC), propylene carbonate (PC), butylene carbonate (BC), fluoroethylene carbonate, ethyl methyl carbonate (EMC), dimethyl carbonate (DMC), diethyl carbonate (DEC), dipropyl carbonate (DPC), methyl propyl carbonate (MPC), ethylene propyl carbonate (EPC), 1,4-butyrolactone, methyl propionate, methyl butyrate, ethyl acetate, ethyl propionate, and ethyl butyrate.

In addition, the non-aqueous organic solvent may also optionally comprises one or more solvents selected from methyl acrylate, dimethyl sulfite, diethyl sulfite, acid anhydride, N-methylpyrrolidone, N-methylformamide, N-methylacetamide, acetonitrile, N,N-dimethylformamide, dimethyl sulfoxide, methyl sulfide, and tetrahydrofuran.

The preparation method of the electrolyte is not limited, and can be prepared according to a conventional method. For example, it can be obtained by the following method: mixing the above-mentioned organic solvent, and adding an electrolyte salt thereto.

Battery Module

The third aspect of the present application relates to a battery module, comprising the secondary battery described in the second aspect of the present application. The number of secondary batteries in the battery module can be adjusted according to the application and capacity design of the battery module.

Battery Pack

The fourth aspect of the present application relates to a battery pack, comprising the battery module described in the third aspect of the present application.

Apparatus

The fifth aspect of the present application relates to an apparatus, comprising the secondary battery according to the second aspect of the present application, and the secondary battery is used as a power source or an energy storage unit of the apparatus. Optionally, the apparatus comprises a battery electric vehicle, a hybrid electric vehicle, a plug-in hybrid electric vehicle, an electric bicycle, an electric scooter, an electric golf cart, an electric truck, an electric ship, and an energy storage system.

The above content of the present application is not intended to describe each disclosed embodiment or every implementation in the present application. The following description more specifically exemplifies exemplary embodiments. In many places throughout the application, guidance is provided through a series of examples, which can be used in various combinations. In each instance, the enumeration serves only as a representative group and should not be construed as an exhaustive list.

EXAMPLES

The following examples will give a more detailed description of the disclosure of the present application. It should be understood that these embodiments are only used for explaining the present application, rather than limiting the scope of the present application. Unless otherwise stated, all parts, percentages, and ratios described in the following embodiments are based on weight, all reagents used in the embodiments are commercially available or synthesized according to conventional methods and can be directly used without further treatment, and all instruments used in the embodiments are commercially available.

Example 1

Preparation of Composite Material

Tetraethyl orthosilicate (TEOS) was dispersed in ethanol, stirred and mixed to obtain an ethanol dispersion of tetraethyl orthosilicate; the core material was dispersed in the dispersion, and stirred at room temperature to make the material uniformly disperse to obtain a suspension; the dispersion of tetraethyl orthosilicate was slowly added dropwise into the suspension, and continued to stir during the dropping; the mixture was mechanically stirred and evaporated to dryness at a temperature of 80° C.-100° C., and $SiO_2 \cdot nH_2O$ obtained from the hydrolysis of the tetraethyl orthosilicate was coated on the surface of the core material. The resulting powder sample was transferred to an oven for drying and grinding to obtain a silica-coated composite material.

Preparation of Positive Electrode Plate $LiNi_{0.8}Mn_{0.1}Co_{0.1}O_2$ as a positive active material, the composite material, acetylene black as a conductive agent, and polyvinylidene fluoride (PVDF) as a binder were mixed thoroughly at a weight ratio of 95:X:3:2 in a solvent system of N-methyl pyrrolidone to obtain the positive electrode slurry. The positive electrode slurry was evenly coated on the front and back sides of the aluminum foil with a thickness of 14μm; the aluminum foil was dried at room temperature and then transferred to a blower oven at 120° C. to dry for 1 h, then cold pressed and slit to obtain the positive electrode plate. The specific types and proportions of composite materials used in the preparation of positive electrode plate were shown in Table 1. In Table 1, the proportion of the composite material was the weight percentage based on the total weight of the positive active material.

Preparation of Negative Electrode Plate

Artificial graphite as a negative active material a, Super-P as a conductive agent, the CMC as a thickener, and styrene butadiene rubber (SBR) as a binder were dissolved in the solvent deionized water at a mass ratio of 96:2: 1:1 and mixed uniformly to prepare a negative electrode slurry. The negative electrode slurry was then uniformly coated on the front and back sides of the current collector copper foil, and the coating amount was 0.0071 $g/cm^2$, and then it was dried at 85° C. and then cold pressed, trimmed, cut, slit, then dried at 110° C. for 4 hours under vacuum conditions, then the tabs were welded thereon to prepare the negative electrode plate for lithium ion battery.

Preparation of Electrolyte

In a glove box filled with argon gas, ethylene carbonate (EC) and diethyl carbonate (DEC) were mixed at a mass ratio of EC:DEC=20:80 as a non-aqueous organic solvent. Lithium hexafluorophosphate was added to the non-aqueous organic solvent, and the concentration of the lithium salt was 1.0 mol/L, and then an additive was added to the non-aqueous organic solvent, and the electrolyte was formed after uniform mixing Preparation of Secondary Battery A 12 μm polyethylene film (PE) was used as the separator. The prepared positive electrode plate, separator, and negative electrode plate were laminated in order so that the separator was in the middle of the positive and negative electrode plates, wound to obtain the bare core, and welded with the tabs, then the bare core was placed in the outer packaging, and the above-prepared electrolyte was injected into the dried battery, encapsulated, stood, then charged to 3.3V with a constant current of 0.02 C, then charged to 3.6V with a constant current of 0.1 C, shaped, and tested the capacity to complete the preparation of the lithium-ion battery. The prepared soft-packed lithium-ion battery had a thickness of 4.0 mm, a width of 60 mm, and a length of 140 mm.

Different from Example 1, the process parameters of Examples 2-17 and Comparative Examples 1-7 were adjusted as shown in Table 1.

Example 18

Preparation of Composite Material

The preparation of the composite material was exactly the same as in Example 1.

Preparation of Positive Eelectrode Plate $LiNi_{0.8}Mn_{0.4}Co_{0.1}O_2$ as a positive active material, acetylene black as a conductive agent, and polyvinylidene fluoride (PVDF) as a binder were mixed thoroughly at a weight ratio of 95:3:2 in a solvent system of N-methyl pyrrolidone to obtain the positive electrode slurry. The positive electrode slurry was evenly coated on the front and back sides of the aluminum foil with a thickness of 14 μm; the aluminum foil was dried at room temperature and then transferred to a blower oven at 120° C. to dry for 1 h, then cold pressed and slit to obtain the positive electrode plate.

Preparation of Negative Electrode Plate

Artificial graphite as a negative active material a, Super-P as a conductive agent, the CMC as a thickener, styrene butadiene rubber (SBR) as a binder and the above prepared composite material were dissolved in the solvent deionized water at a mass ratio of 96:2:1:1:X and mixed uniformly to prepare a negative electrode slurry. The negative electrode slurry was then uniformly coated on the front and back sides of the current collector copper foil, and the coating amount was 0.0071 g/cm², and then it was dried at 85° C. and then cold pressed, trimmed, cut, slit, then dried at 110° C. for 4 hours under vacuum conditions, then the tabs were welded thereon to prepare the negative electrode plate for lithium ion battery. The specific types and proportions of composite materials used in the preparation of negative electrode plate were shown in Table 1. In Table 1, the proportion of the composite material was the weight percentage based on the total weight of the negative active material.

Preparation of Secondary Battery

The preparation of the secondary battery was exactly the same as in Example 1.

Examples 19-20

Preparation of Composite Material

The preparation of the composite material was exactly the same as in Example 1.

Preparation of positive electrode plate $LiNi_{0.8}Mn_{0.1}Co_{0.1}O_2$ as a positive active material, acetylene black as a conductive agent, and polyvinylidene fluoride (PVDF) as a binder were mixed thoroughly at a weight ratio of 95:3:2 in a solvent system of N-methyl pyrrolidone to obtain the positive electrode slurry. The positive electrode slurry was evenly coated on the front and back sides of the aluminum foil with a thickness of 14 μm; the aluminum foil was dried at room temperature and then transferred to a blower oven at 120° C. to dry for 1 h, then cold pressed and slit to obtain the positive electrode plate.

Preparation of Negative Electrode Plate

Artificial graphite as a negative active material a, Super-P as a conductive agent, the CMC as a thickener, and styrene butadiene rubber (SBR) as a binder were dissolved in the solvent deionized water at a mass ratio of 96:2:1:1 and mixed uniformly to prepare a negative electrode slurry. The negative electrode slurry was then uniformly coated on the front and back sides of the current collector copper foil, and the coating amount was 0.0071 g/m², and then it was dried at 85° C. and then cold pressed, trimmed, cut, slit, then dried at 110° C. for 4 hours under vacuum conditions, then the tabs were welded thereon to prepare the negative electrode plate for lithium ion battery.

Preparation of Separator

A 12 μm polyethylene film (PE) was used as the separator matrix. The above composite material was dissolved in deionized water as a solvent and mixed uniformly to form a slurry, and then the slurry was uniformly coated on the front and back sides of the separator, and then dried at 85° C. to form a separator containing the composite material.

Preparation of Secondary Battery

Except the separator used, the preparation of the secondary battery was basically the same as in Example 1.

| No. | Position (positive electrode, negative electrode, separator) | Core material | Particle size of core material μm | Shell material | Weight ratio of core to shell | Proportion of composite materials wt % | Ratio of weight of composite material in separator to surface area separator of g/m² | Particle size of composite material μm | Resistivity of composite material Ω · cm | BET of composite material m²/g |
|---|---|---|---|---|---|---|---|---|---|---|
| Example 1 | Positive electrode | Copper | 0.1 | Silicon dioxide | 16 | 2 | \ | 1.4 | 10⁷ | 9 |
| Example 2 | Positive electrode | Copper | 0.3 | Silicon dioxide | 16 | 2 | \ | 1.4 | 10⁷ | 9 |
| Example 3 | Positive electrode | Copper | 0.5 | Silicon dioxide | 16 | 2 | \ | 1.4 | 10⁷ | 9 |
| Example 4 | Positive electrode | Copper | 0.3 | Silicon dioxide | 10 | 2 | \ | 1.4 | 10⁷ | 9 |

|  | Composite material | | | | | | | | |
|---|---|---|---|---|---|---|---|---|---|
| No. | Position (positive electrode, negative electrode, separator) | Core material | Particle size of core material μm | Shell material | Weight ratio of core to shell | Proportion of composite materials wt % | Ratio of weight of composite material in separator to surface area separator of g/m$^2$ | Particle size of composite material μm | Resistivity of composite material Ω·cm | BET of composite material m$^2$/g |
| Example 5 | Positive electrode | Copper | 0.3 | Silicon dioxide | 20 | 2 | \ | 1.4 | 10$^7$ | 9 |
| Example 6 | Positive electrode | Copper | 0.3 | Silicon dioxide | 16 | 0.5 | \ | 1.4 | 10$^7$ | 9 |
| Example 7 | Positive electrode | Copper | 0.3 | Silicon dioxide | 16 | 5 | \ | 1.4 | 10$^7$ | 9 |
| Example 8 | Positive electrode | Copper | 0.3 | Silicon dioxide | 16 | 2 | \ | 0.3 | 10$^7$ | 19 |
| Example 9 | Positive electrode | Copper | 0.3 | Silicon dioxide | 16 | 2 | \ | 2.6 | 10$^7$ | 5 |
| Example 10 | Positive electrode | Copper | 0.3 | Silicon dioxide | 16 | 2 | \ | 1.4 | 10$^6$ | 9 |
| Example 11 | Positive electrode | Copper | 0.3 | Silicon dioxide | 16 | 2 | \ | 1.4 | 10$^8$ | 9 |
| Example 12 | Positive electrode | Copper | 0.3 | Silicon dioxide | 16 | 2 | \ | 1.6 | 10$^7$ | 7 |
| Example 13 | Positive electrode | Copper | 0.3 | Silicon dioxide | 16 | 2 | \ | 1.3 | 10$^7$ | 12 |
| Example 14 | Positive electrode | Copper | 0.3 | Titanium dioxide | 16 | 2 | \ | 1.3 | 10$^7$ | 12 |
| Example 15 | Positive electrode | Copper oxide | 0.3 | Silicon dioxide | 16 | 2 | \ | 1.4 | 10$^7$ | 9 |
| Example 16 | Positive electrode | Cuprous oxide | 0.3 | Silicon dioxide | 16 | 2 | \ | 1.4 | 10$^7$ | 9 |
| Example 17 | Positive electrode | Copper sulfide | 0.3 | Silicon dioxide | 16 | 2 | \ | 1.4 | 10$^7$ | 9 |
| Example 18 | Negative electrode | Copper | 0.3 | Silicon dioxide | 16 | 2 | \ | 1.4 | 10$^7$ | 9 |
| Example 19 | Separator | Copper | 0.3 | Silicon dioxide | 16 |  | 0.2 | 1.4 | 10$^7$ | 9 |
| Example 20 | Separator | Copper | 0.3 | Silicon dioxide | 16 |  | 0.35 | 1.4 | 10$^7$ | 9 |
| Example 21 | Separator | Copper | 0.3 | Silicon dioxide | 16 |  | 0.5 | 1.4 | 10$^7$ | 9 |
| Comparative Example 1 | \ | \ | \ | \ | \ | \ | \ | \ | \ | \ |
| Comparative Example 2 | Positive electrode | Copper | \ | \ | \ | \ | \ | \ | \ | \ |
| Comparative Example 3 | Positive electrode | Copper oxide | \ | \ | \ | \ | \ | \ | \ | \ |
| Comparative Example 4 | Positive electrode | Cuprous oxide | \ | \ | \ | \ | \ | \ | \ | \ |
| Comparative Example 5 | Positive electrode | Copper sulfide | \ | \ | \ | \ | \ | \ | \ | \ |
| Comparative Example 6 | Negative electrode | Copper | \ | \ | \ | \ | \ | \ | \ | \ |
| Comparative Example 7 | Separator | Copper | \ | \ | \ | \ | \ | \ | \ | \ |

The following tests were performed on the batteries prepared in Examples 1-21 and Comparative Examples 1-7:

(1) Cycle performance test of lithium-ion battery

The lithium-ion battery was charged at a constant current of 1 C to 4.2V at 45° C., then charged at a constant voltage of 4.2V to a current of 0.05 C, and then discharged at a constant current of 1 C to 2.8V. This procedure formed a charge and discharge cycle. Then the battery was subjected to 1000 cycles of charge/discharge test according to the above conditions.

The capacity retention rate (%) of a lithium-ion battery after 1,000 cycles=(discharge capacity for the 1,000th cycle/discharge capacity for the first cycle)×100%.

(2) Overcharge performance test of lithium-ion battery 10 batteries were taken from each of the Comparative examples and the Examples, charged to 4.2V at a constant current rate of 1 C at room temperature, and then charged at a constant voltage of 4.2V until the current was lower than 0.05 C, so that the batteries were fully charged at 4.2V. After overcharging with 1 C current for 1 h, the batteries were stood for observation for 1 h to detect the changes in the surface temperature and voltage of the lithium-ion battery during the overcharging process. After the charging was completed, the battery passed the test if it did not fire or explode.

The results obtained in the hot box test of the batteries according to the comparative examples and examples were shown in Table 2.

| No. | Electrochemical performance Capacity retention rate after 1000 cycles at 45° C. | Overcharge performance (overcharge at 1C for 1 h) |
| --- | --- | --- |
| Example 1 | 79.5% | 6/10 pass |
| Example 2 | 79.4% | 10/10 pass |
| Example 3 | 79.4% | 9/10 pass |
| Example 4 | 79.2% | 7/10 pass |
| Example 5 | 78.3% | 7/10 pass |
| Example 6 | 79.5% | 5/10 pass |
| Example 7 | 78.8% | 10/10 pass |
| Example 8 | 78.4% | 7/10 pass |
| Example 9 | 79.1% | 6/10 pass |
| Example 10 | 78.1% | 8/10 pass |
| Example 11 | 79.1% | 10/10 pass |
| Example 12 | 79.0% | 10/10 pass |
| Example 13 | 78.6% | 10/10 pass |
| Example 14 | 78.8% | 9/10 pass |
| Example 15 | 79.2% | 2/10 pass |
| Example 16 | 79.4% | 10/10 pass |
| Example 17 | 79.1% | 10/10 pass |
| Example 18 | 79.0% | 10/10 pass |
| Example 19 | 79.3% | 8/10 pass |
| Example 20 | 79.3% | 10/10 pass |
| Example 21 | 79.0% | 10/10 pass |
| Comparative Example 1 | 80.0% | 0/10 pass |
| Comparative Example 2 | 0% | 0/10 pass |
| Comparative Example 3 | 74.8% | 2/10 pass |
| Comparative Example 4 | 0.0% | 0/10 pass |
| Comparative Example 5 | 0.0% | 0/10 pass |
| Comparative Example 6 | 0% | 0/10 pass |
| Comparative Example 7 | 0% | 0/10 pass |

From Comparative Examples 1-2, Comparative Examples 4-7 and Examples 1-21, it can be seen that after adding copper, cuprous oxide or copper sulfide alone to the electrode plate or separator, the battery cannot be charged normally. However, when the core material was coated, i.e., when the composite material according to the present application was used, the basic electrical performance of the battery can be maintained; at the same time, it can be seen from Comparative Example 1 and Examples 1-21 that the addition of composite materials can significantly improve the overcharge performance of the battery.

It can be seen from Examples 1-3 that the particle size of the core material in the composite material did not affect the cycle performance of the battery, and if the particle size was too small, it cannot ensure the short-circuit effect in time in overcharge state; if the particle size was too large, it affected the coating effect. From Example 2 and Examples 8-9, it can be seen that when the particle size of the composite material was too small, the specific surface area increased, side reactions increased, and the capacity retention rate decreased; and when the particle size of the composite material was too large, the overcharge effect was influenced. From Example 2 and Examples 6-7, it can be seen that when the composite material was present in a relatively low proportion, the overcharge effect was not good.

Further, it can be seen from Comparative Example 3 and Example 15 that the addition of copper oxide alone can improve overcharge performance, but it affected the battery cycle capacity retention rate. After coating, the battery capacity retention rate was improved, and the improvement of overcharge effect was equivalent to that of uncoated copper oxide, which was related to the mechanism of copper oxide itself.

From Comparative Example 1, Comparative Example 4-5, Example 2 and Example 16-17, it can be seen that copper, cuprous oxide and copper sulfide can better improve the battery overcharge effect after being coated.

It can be seen from Example 13 and Example 14 that for the overcharge performance of lithium-ion batteries, the effect of the silica-coated composite material was better than that of the composite material coated with titanium dioxide.

The above mentioned descriptions only show particular implementations of the present application and but are not intended to limit the protection scope of the present application. Any modification or replacement readily figured out by a person skilled in the art within the technical scope disclosed in the present application shall fall within the protection scope of the present application. Therefore, the protection scope of the present application shall be determined by the protection scope of the claims.

What is claimed is:

1. A secondary battery comprising an outer packaging and a battery and an electrolyte contained in the outer packaging, the battery comprising a positive electrode plate, a negative electrode plate, and a separator, wherein at least one of the positive electrode plate, the negative electrode plate and the separator comprises a composite material with a core-shell structure, wherein a core material comprises metallic copper or a copper-containing compound; a shell material comprises at least one of silicon dioxide and titanium dioxide; and wherein the core material has an the average particle size D50 of 0.01 μm-5 μm, and wherein the weight ratio of the core to the shell is from 10:1 to 20:1, when the separator comprises the composite material, the addition amount of the composite material per unit area of the separator is 0.1 g/m$^2$-3 g/m$^2$; or when the negative electrode plate comprises the composite material, the composite material is added in an amount of 0.2% to 20% by weight, relative to the weight of the negative active material contained in the negative electrode plate; or when the positive electrode plate comprises the composite material, the composite material is added in an amount of 0.2% to 20% by weight, relative to the weight of the positive active material contained in the positive electrode plate.

2. The secondary battery according to claim 1, wherein the separator has a thickness of less than 20 μm.

3. A battery module comprising the secondary battery according to claim 1.

4. A battery pack comprising the battery module according to claim 3.

5. An apparatus comprising the secondary battery according to claim 1, wherein the secondary battery is used as a power source or an energy storage unit of the apparatus.

6. The secondary battery according to claim 1, wherein the core material has an average particle size D50 of 0.1 μm-3 μm.

7. The secondary battery according to claim 1, wherein the shell has an average thickness of 10 nm-2 μm.

8. The secondary battery according to claim 1, wherein the composite material has a resistivity of $10^6$ Ω·cm-$10^{10}$ Ω·cm, and/or, the composite material has a BET of 0.2 m$^2$/g-20 m$^2$/g.

9. The secondary battery according to claim 1, wherein the secondary battery is a lithium-ion secondary battery.

10. The secondary battery according to claim 1, when the separator comprises the composite material, the addition amount of the composite material per unit area of the separator is 0.2 g/m$^2$-0.5 g/m$^2$.

11. The secondary battery according to claim 1, when the negative electrode plate comprises the composite material, the composite material is added in an amount of 0.3% to 10% by weight, relative to the weight of the negative active material contained in the negative electrode plate.

12. The secondary battery according to claim 1, when the positive electrode plate comprises the composite material, the composite material is added in an amount of 0.3% to 10% by weight, relative to the weight of the positive active material contained in the positive electrode plate.

13. The secondary battery according to claim 1, wherein the separator has a thickness of 6 μm to 16 μm.

14. The apparatus according to claim 5, wherein the apparatus comprises a battery electric vehicle, a hybrid electric vehicle, a plug-in hybrid electric vehicle, an electric bicycle, an electric scooter, an electric golf vehicle, an electric truck, an electric ship, and an energy storage system.

* * * * *